United States Patent

[11] 3,607,824

[72] Inventors Zissis Aggias
 Hilden/Rhineland;
 Gunter Tauber, Dusseldorf-Reisholz, both of, Germany
[21] Appl. No. 804,989
[22] Filed Mar. 6, 1969
[45] Patented Sept. 21, 1971
[73] Assignee Henkel & Cie GmbH
 Dusseldorf-Holthausen, Germany
[32] Priority Mar. 12, 1968
[33] Switzerland
[31] 3608

[54] MODIFIED GLYCIDYL ISOCYANURATE RESINS AND PROCESS
 6 Claims, No Drawings

[52] U.S. Cl. ........................................... 260/37 N,
 260/37 EP
[51] Int. Cl. ........................................... C08g 51/04
[50] Field of Search ........................................... 260/37 N,
 77.5

[56] References Cited
 UNITED STATES PATENTS
 3,337,509 8/1967 Budnowski .................. 260/77.5 ISO
 3,470,132 9/1969 Ernst et al. .................... 260/77.5 ISO X
 OTHER REFERENCES
 Lee et al.: Handbook of Epoxy Resins; McGraw-Hill Book Co.; 1967; pages 12- 23, 12- 25, and 14-4; Sci. Lib., TP 1180.E6 L4.

*Primary Examiner*—Morris Liebman
*Assistant Examiner*—L. T. Jacobs
*Attorney*—Hammond & Littell

ABSTRACT: An adhesive composition which is liquid or pasty at room temperature comprising a reaction product of (1) a content of triglycidyl isocyanurate having an epoxide oxygen content of at least 14 percent, (2) an epoxide resin hardener anhydride of an organic polycarboxylic acid having a melting point below 40° C., (3) an organic polycarboxylic acid polyanhydride, and (4) a thixotrophy-producing means, said reaction product produced by homogenizing said ingredients at temperatures between 50° C. and 80° C., as well as the process of producing said adhesive composition and its utilization.

MODIFIED GLYCIDYL ISOCYANURATE RESINS AND PROCESS

THE PRIOR ART

Adhesive compositions based on crystalline triglycidyl isocyanurate and so-called heat hardeners are known. With these compositions, which are usually pulverulent mixtures, for example, firm bonds can be made between metals which bonds also have excellent shear strengths when hot. Such adhesive compositions, however, are very fluid when hot and easily run off from the parts to be bonded. Moreover, the handling of pulverulent mixtures often brings with it difficulties in the measuring out and application to the parts to be bonded.

OBJECTS OF THE INVENTION

An object of the invention is to find adhesive compositions based on triglycidyl isocyanurate which are liquid or pasty at room temperature, which may rapidly harden at elevated temperature and not run off from the parts to be bonded and which give bonds which still have a high resistance to heat.

Another object of the invention is the obtention of an adhesive composition which is liquid or pasty at room temperature comprising a reaction product of (1) a content of triglycidyl isocyanurate having an epoxide oxygen content of at least 14 percent, (2) an epoxide resin hardener anhydride of an organic polycarboxylic acid having a melting point below 40° C., (3) an organic polycarboxylic acid polyanhydride, and (4) a thixotrophy producing means, said reaction product produced by homogenizing said ingredients at temperatures between 50° C. and 80° C.

A further object of the invention is the development of a process for the obtention of adhesive compositions based on triglycidyl isocyanurate and epoxide resin acid anhydride hardeners together with thixotrophy-producing means.

A yet further object of the invention is the obtention of firm, high-temperature-resistant bonds between solid surfaces utilizing the adhesive compositions of the invention.

These and other objects of the present invention will become more apparent as the description thereof proceeds.

DESCRIPTION OF THE INVENTION

The present invention, therefore, provides an adhesive composition, liquid or pasty at room temperature comprising the reaction product of (1) triglycidyl isocyanurate having an epoxide content of at least 14 percent ((2) an organic polycarboyxlic acid anhydride melting below 40° C., ( ) ) an organic polycarboyxlic acid polyanhydride, and (4 thixotrophy-producing means.

The crystalline triglycidyl isocyanurate to be used according to the process of the invention should have an epoxide oxygen content of at least 14 percent. The preparation of such crystalline triglycidyl isocyanurate is known as such and described in U.S. Pat. No. 3,337,509, dated Aug. 22, 1967. This preparation can be accomplished by purifying the crude reaction products obtainable, for example, by reacting cyanuric acid with an excess of epichlorohydrin. Crsytalline triglycidyl isocyanurate with the required epoxide oxygen content can be obtained by a single or by repeated recrystallizations from suitable solvents such as methanol.

With reference to the epoxide resin hardener anhydride of an organic polycarboxylic acid having a melting point below 40° C., both pure anhydrides and liquid or low-melting mixtures can be used as the organic polycarboxylic acid anhydrides melting below 40° C. Thus, for example, methylsuccinic acid anhydride; nonylsuccinic acid anhydride; dodecenylsuccinic acid anhydride; the addition product of maleic acid anhydride to methylcyclopentadiene; methyltetrahydrophthalic acid anhydride; hexahydrophthalic acid anhydride; or liquid eutectic mixtures of the product of addition of maleic acid anhydride to methylcyclopentadiene and hexahydrophthalic acid anhydride, phthalic acid anhydride, tetrahydrophthalic acid anhydride or mixtures of dodecenylsuccinic acid anhydride and hexahydropthalic acid anhydride are suitable. Obviously, noneutectic mixtures of the above-mentioned polycarboxylic acid anhydrides melting below 40° C. can also be used.

Suitable organic polycarboxylic acid polyanhydrides for use in the compositions of the invention are, for example, adipic acid polyanhydride, sebacic acid polyanhydride, azelaic acid polyanhydride and hexahydrophthalic polyanhydride, terephthalic polyanhydride, naphthalenedicarboxylic acid-2, 6- polyanhydride. The polymeric carboxylic acid anhydrides can easily be prepared by splitting off water, for example using acetic acid anhydride, from the initial carboxylic acids.

The total amount of carboxylic acid anhydride groups in the compositions of the invention should be adjusted so that from 0.6 to 1.2 , preferably from 0.8 to 0.9 carboxylic acid anhydride groups are present for each epoxide group in the crystalline triglycidyl isocyanurate. The amount of organic polycarboyxlic acid anhydride melting below 40° C., present in the mixture of carboxylic acid anhydrides should be from about 6 percent to about 95 percent by weight of the total anhydride content, preferably from about 70 percent to 90 percent by weight.

The heat-hardening adhesives according to the invention should also contain thixotrophy-producing means, for example, asbestos fibers, finely divided silicic acid, zirconium silicate, bentonite, aluminum hydroxide and others. The thixotrophy-producing means should be present in an amount of from about 5 percent to about 40 percent especially from 10 percent to 30 percent by weight, based on the mixture of triglycidyl isocyanurate and the carboxylic acid anhydrides. In addition to these thixotrophy-producing fillers, minor amounts of so-called inactive fillers may also be coemployed, for example, titanium oxide, graphite, iron oxide, dolomite and others, are suitable.

In order to prepare the adhesive compositions according to the invention, the said components are mixed and suitably heated at about 50° C., to 80° C. and homogenized. They are then allowed to cool to room temperature. The liquid to pasty adhesive compositions according to the invention are stable for months at room temperature.

For the production of the adhesive bonds, the mixture is applied as thinly as possible to the solid objects to be bonded. After joining the coated solid objects, heating is effective at 150° C. to 200° C., especially at 160° C. to 180° C. The adhesives harden at these temperatures within 5 to 60 minutes to give firm bonds which are high-temperature-resistant.

Almost all materials which can stand the temperature needed for the hardening can be bonded with these adhesive compositions. For example, metals such as aluminum, iron, refined steel, copper, nickel, chromium, zinc, brass, titanium or chromium can be bonded. In amics, concrete, wood and in some cases hardened thermosetting resins or duroplasts such as melamine, urea or phenol resins. Particularly, the adhesive compositions are useful for the preparation of bonded joints between metallic and nonmetallic materials. They can also be utilized for bonding electrical apparatus components. They find use also in the automotive industry for the preparation of adhesive bonds which are required to be heat resistant.

The adhesive bonds have a high tensile shear strength, even when heated, which is not inferior to that obtained with bonds with triglycidyl isocyanurate prepared with the usual hardeners. Compared with these prior art compositions, however, the adhesive compositions of the present invention have the advantage that the adhesive does not escape from the joints even at higher temperatures. The curing is carried out rather rapidly compared with other epoxide resin mixtures. Moreover, the liquid or pasty adhesive mixtures are more easily applied to the workpieces than pulverulent substances.

The following specific embodiments are illustrative of the practice of the invention. They are not, however, to be deemed limitative in any manner.

EXAMPLE 1

A homogeneous mixture of 100 g. of crystalline triglycidyl isocyanurate (epoxide oxygen content =15.2 percent) and 120 g. of methylhexahydrophthalic anhydride, 20 g. of adipic acid polyanhydride and 40 g. of asbestos fibers (0.5 to 1.0 mm. in length) was prepared by heating the ingredients at 70° C. for 10 minutes. This pasty mixture was storable (unchanged) for more than 3 months.

Aluminum plates measuring 10 ×25 ×1.5 mm. were thinly coated with the paste and placed together with an overlap of about 2 cm.$^2$. After fixing, they were heated at 120° C for 15 minutes.

The following values for the shear strength were measured on 3 samples in each case:

1.5 kp./mm.$^2$ at 120° C.

1.4 kp./mm.$^2$ at 150° C.

EXAMPLE 2

A homogeneous mixture of 100 g. of triglycidyl isocyanurate (epoxide oxygen content=15.2 percent), 120 g. of hexahydrophthalic anhydride, 20 g. of adipic acid polyanhydride and 30 g. of asbestos fibers were prepared by heating at 70° C. for a short period.

As described in example 1, aluminum sheets were bonded together by hardening at 180° C. for 15 minutes.

The shear strength at 120° C. amounted to 2.15 kp./mm.$^2$ and at 150° C. to 1.15 kp./mm.$^2$.

The preceding specific embodiments are illustrative of the practice of the invention. It is to be understood, however, that other expedients known to those skilled in the art can be employed without departing from the spirit of the invention.

We claim:

1. An adhesive composition which is liquid or pasty to room temperature comprising a reaction product of (A) from about 60 percent to 95 percent by weight of a mixture of (1) triglycidyl isocyanurate having an epoxide oxygen content of at least 14 percent, (2) an epoxide resin hardener anhydride of an organic polycarboxylic acid having a melting point below 40° C. and (3) an organic polycarboxylic acid polyanhydride, said anhydride components 2 and 3 being in such an amount that from 0.6 to 1.2 carboxylic acid anhydride groups are present for each epoxide group, said anhydride component 2 being from about 60 percent to 95 percent by weight of the total anhydride components, and (B) from about 5 percent to 40 percent by weight of a thixotrophy-producing means, said reaction product produced by homogenizing said ingredients at temperatures between 50° and 80° C.

2. The composition of claim 1 wherein from 0.8 to 0.9 organic carboxylic acid anhydride groups are present for each epoxide group in said triglycidyl isocyanurate.

3. The composition of claim 1 wherein from about 70 percent to 90 percent by weight of the total acid anhydride content is that of said organic polycarboxylic acid anhydride having a melting point below 40° C.

4. The composition of claim 1 wherein said thixotrophy-producing means is selected from the group consisting of asbestos fibers, finely divided silicic acid, zirconium silicate, betonite and aluminum hydroxide, 5. A process for the production of the adhesive composition of claim 1 which comprises mixing said ingredients, heating to a temperature of from 50° C. to 80° C., homogenized and subsequently cooling.

6. The composition of claim 1 wherein said mixture (A( is present in an amount of from 70 percent to 90 percent by weight and said thixotrophy-producing means (B) is present in an amount of from 10 percent to 30 percent by weight.